United States Patent [19]

Sugihara et al.

[11] Patent Number: 5,066,399
[45] Date of Patent: Nov. 19, 1991

[54] BELT PRESS TYPE DEHYDRATION DEVICE

[76] Inventors: Kazutoyo Sugihara, 964-38, Niihashi, Gotenba City, Shizuoka Pref.; Yasuhide Kinoda, 2-3-16, Matsugaoka, Kugenuma, Fujisawa City, Kanagawa Pref., both of Japan

[21] Appl. No.: 868,284

[22] Filed: May 28, 1986

[51] Int. Cl.$^5$ .............................................. B01D 33/04
[52] U.S. Cl. ...................................... 210/401; 100/118; 100/152; 100/153
[58] Field of Search ................... 210/DIG. 3, 401, 400, 210/386, 391, 396; 100/118, 151, 152, 153; 162/305, 360.1

[56] References Cited

U.S. PATENT DOCUMENTS 3,807,559 4/1974 Horn .................................. 210/401
3,979,296 9/1976 Bastgen ............................. 210/400

FOREIGN PATENT DOCUMENTS 12001980 12/1980 European Pat. Off. ............. 210/400

*Primary Examiner*—W. Gary Jones
*Attorney, Agent, or Firm*—Gifford, Groh, Sprinkle, Patmore and Anderson

[57] ABSTRACT

A belt press type dehydration device of improved efficiency includes upper and lower pressing belts of dual layer construction. A first mesh member layer is made of Z-shaped interlocked wire members, and to this is fastened the filter sheet layer. The meshed member layer is designed to provide support for the filter sheet layer and to engage sprocket teeth driven by a motor to advance the belts. Since high tensile strength is no longer required of the filter sheet, it can be thinner and coarser than before, leading to increased dehydration efficiency. Also, the number of pressing drums can be reduced due to the increased efficiency. The upper belt mash layer is made of two separate mesh loops attached to each edge of the filter sheet layer. Sprockets adjacent the pressing drums are spaced near the edges of the belts, to reduce or eliminate leakage over the edges during pressing.

4 Claims, 7 Drawing Sheets

BELT PRESS TYPE DEHYDRATION DEVICE

BACKGROUND OF THE INVENTION

1. Field of the Invention

The present invention relates to a sludge dehydration device and, more particularly, to a device provided with belts to press and dehydrate the sludge.

2. Description of the Prior Art

A large amount of concentrated sludge, having a large amount of water contained therein, is produced at sewage treatment plants and other various industrial discharge treatment plants. This concentrated sludge is not dumped away as is and, therefore, a dehydration device must be equipped to dehydrate the sludge further. To provide for such further dehydration, there conventionally have been used dehydration devices of the belt press type which place the concentrated sludge between two sheets of belts to press and dehydrate it into dehydrated cakes. FIG. 1 shows an example of the previously known belt press type dehydration devices.

Referring to FIG. 1, an endless lower belt 1 and an upper belt 2 composed of filter sheets are driven at the same speed. Concentrated sludge A is supplied onto the lower belt 1 from a chute 3. The concentrated sludge is conveyed by the lower belt 1 and is forced between the lower belt 1 and the upper belt 2 where the sludge is pressed by multiple drums 4. By this pressure the concentrated sludge A is dehydrated by pressing water through both belts 1 and 2 and the sludge is made into dehydrated cakes A'. The cakes A' are scraped from each of the belts 1 and 2 by the scrapers 5 and 6.

Thus, in the previously known dehydration devices of the belt press type, the belts are laid on the rollers 7 and 8 and over the press drums 4 and are driven by the tension of the belts. Accordingly, both the upper belt 2 and lower belt 1 must be provided with sufficient tensile strength to withstand the tension imposed by the other components. Therefore, previously known belts 1 and 2 are composed of closely woven, thick filter sheets in order to provide sufficient tensile strength.

These closely woven, thick filter sheets have a number of disadvantages. Due to their thickness, their dehydrating efficiency is extremely low and several steps involving pressing drums 4 are required. Ordinarily, as many as 10 pressing steps are involved which result in a large, complicated and expensive dehydration device. To partially increase the dehydrating efficiency of closely woven, thick filter sheets, vaccum equipment has been installed on the underside of the lower belt 1 to forcibly draw water through the filter sheet. Such additional equipment adds further complication and expense to the devices.

In typical previously known dehydration devices, the belts 1 and 2 are washed with water after the dehydrated cakes A' are scraped off. Due to the closely woven, thick filter sheets of the prior art, a large amount of high pressured water was required to wash the belts. This further reduced the working efficiency of the devices.

In the previously known belt press type dehydration devices using rollers, the concentrated sludge A is not always placed evenly across the width of the belt and, consequently, the belts tend to slip and meander on the rollers 7 and 8 as they progress through the several steps of the pressing drums 4. Accordingly, in these conventional devices, many auxiliary units must be set up in many places and because of this, the devices grew complex.

Finally, the cost of replacing the previously known closely woven, thick filter sheet belts was relatively expensive and the necessity of changing wasted belts made operation of the device costly.

SUMMARY OF THE PRESENT INVENTION

The object of the present invention is to provide a belt press type dehydration device which overcomes all of the above-mentioned disadvantages of the previously known devices. The dehydration device of the present invention includes upper and lower belts which are each composed of two layers. The first layer consists of a filter sheet which is coarser and thinner than those previously known. The second layer comprises a meshed member to which the filter sheet is fastened. The coarser, thinner filter sheet provides increased dehydration efficiency, enabling as few as 1 or 2 of the pressing drum steps. The result is a more efficient, less costly dehydration device which requires less water to wash the belts once the dehydrated cakes A' are scraped off.

The meshed member layers are on the interior of the belts and form straight portions which can be engaged by sprocket teeth on the drive rollers. Engagement of the teeth with the meshed member substantially prevents slipping or meandering of the belt on the rollers without additional auxiliary units. Moreover, coarser and thinner filter sheets are made possible because high tensile strength of the belt is unnecessary since sprocket engagement rather than tension drives the belt.

BRIEF DESCRIPTION OF THE DRAWINGS

A better understanding of the present invention will be had upon reference to the following detailed description, when read in conjunction with the accompanying drawings, wherein like reference characters refer to like parts throughout the several views, and in which.

DETAILED DESCRIPTION OF THE PREFERRED EMBODIMENT

Figure 1:
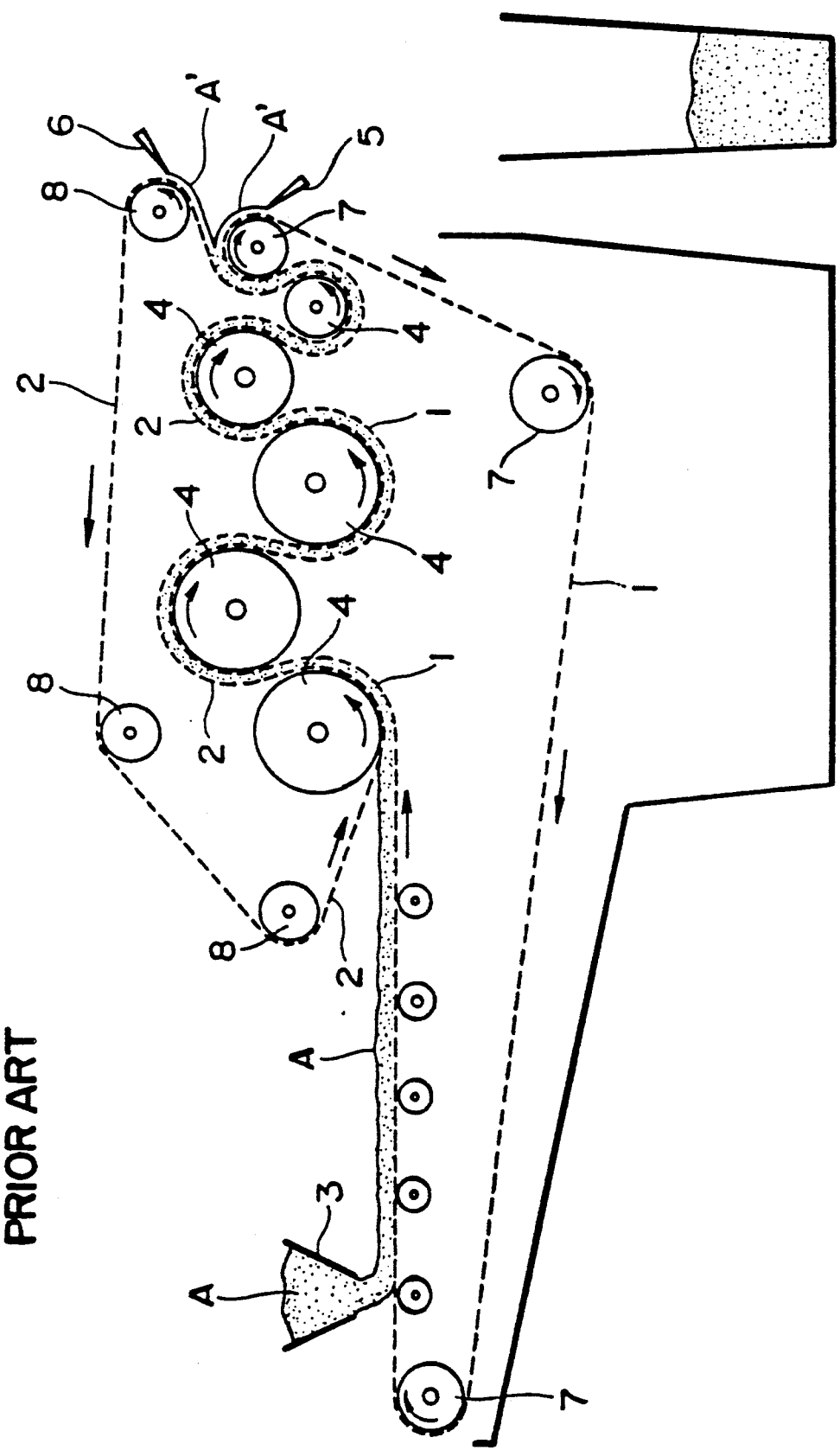
FIG. 1 is a schematic mechanical drawing of the conventional belt press type dehydration device known in the prior art.

Referring first to FIGS. 2, 3, 4 and 6, the lower belt 10 of a preferred embodiment of a belt press type dehydration device according to the present invention comprises a meshed member 11. The meshed member 11 forms an endless belt by combining a wire 12, generally having a Z-shaped bending portion 12a, with an inverted Z-shape bending portion 12b alternately at regular intervals. The meshed member 11 further comprises straight portions 12c and 12c' extending between the bending portions at different but parallel levels towards the length direction of the belt 10. At both edges of the meshed member 11, a filter sheet 13 is fixed thereto by fasteners 14. The filter sheet 13 is composed of a thin, coarse sheet.

Figure 2:
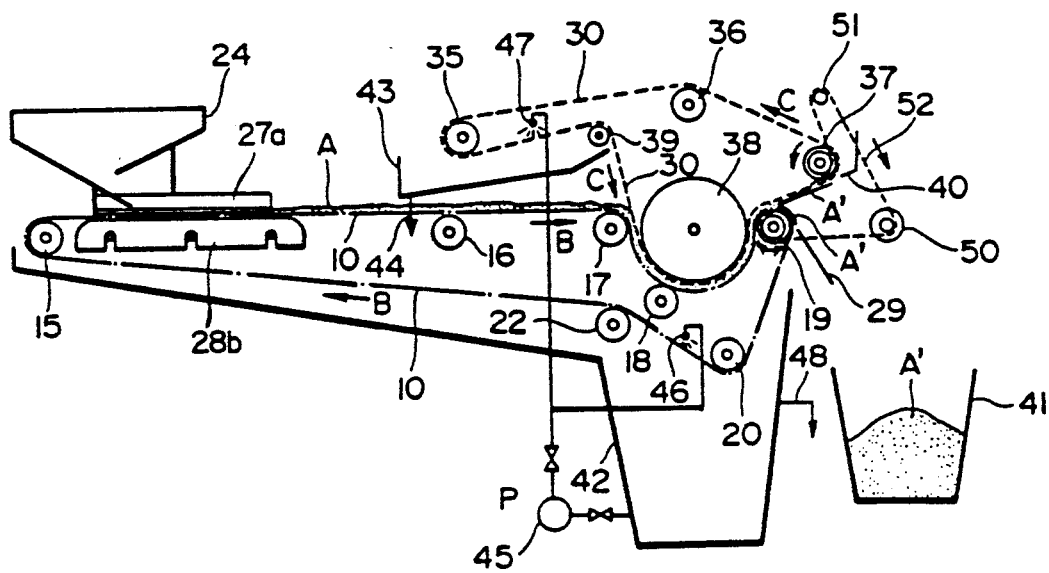
FIG. 2 is a schematic mechanical drawing of an embodiment according to the present invention.
Figure 3:
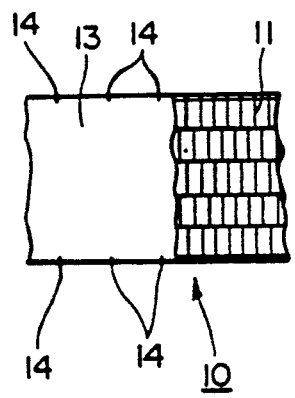
FIG. 3 is a schematic plan view of the composition of the lower belt.
Figure 4:
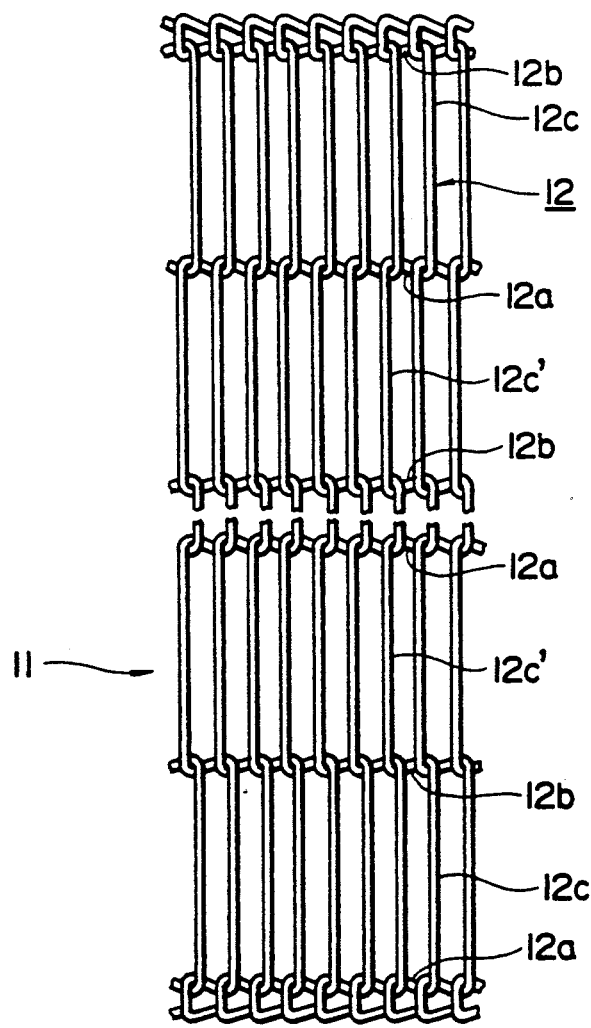
FIG. 4 is a plan view of the meshed member of the lower belt.
Figure 5:
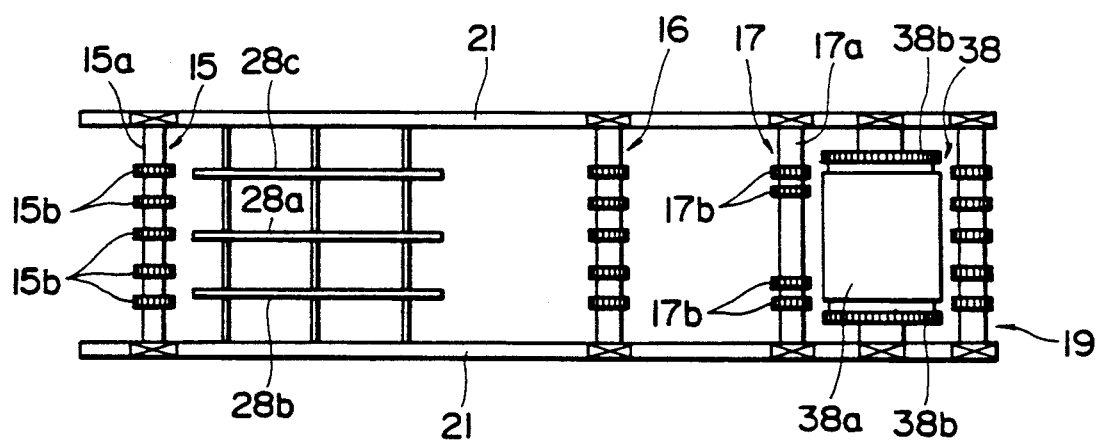
FIG. 5 is a schematic plan view of the driving mechanism of the lower belt and the press drum.
Figure 6:
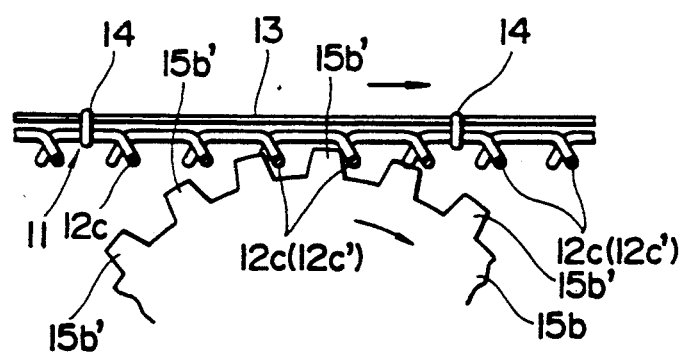
FIG. 6 is a sectional view illustrating the relationship between the drive sprockets and the lower belt.

Consequently, as best shown in FIG. 6, the lower belt 10 has the meshed member 11 disposed interiorly and the filter sheet 13 disposed exteriorly and the belt 10 is disposed around the sprocket rollers 15, 16, 17, 18, 19 and 20 (see FIG. 2). As best shown in FIG. 5, the sprocket rollers 15–20 each comprise sprocket wheels (e.g., 15b) at regular intervals on the axis portion 15a. Each sprocket wheel 15b comprises sprocket teeth 15b' which engage the straight portions 12c and 12c' of the meshed member 11 of the lower belt 10. The sprocket roller 15 is rotatably attached to a frame 21 at a take up portion of the lower belt 10.

The sprocket rollers 16, 19 and 29 are of the same form as the sprocket roller 15 and are also rotatably attached to the frame 21. The sprocket roller 16 is positioned between a take up portion of the lower belt 10 and a press drum 38 to be described subsequently. The sprocket roller 19 is positioned just behind the press drum 38, and sprocket roller 20 is positioned at the return portion of the lower belt 10.

With reference now to FIGS. 2 and 5, a sprocket roller 17 is rotatably secured to the frame 21 at a position just before the press drum 38. The sprocket roller 17 also comprises an axis 17a to which are attached sprocket wheels 17b which engage the straight portions 12c and 12c' of the meshed member 11 at each edge of the belt 10. A sprocket roller 18, of the same form as the sprocket roller 17 is rotatably secured to the frame 21 at a position just below the press drum 38.

Roller 22 is adapted to abut the filter sheet 13 side of the lower belt 10 from beneath the returning portion of the belt 10.

Figure 7:
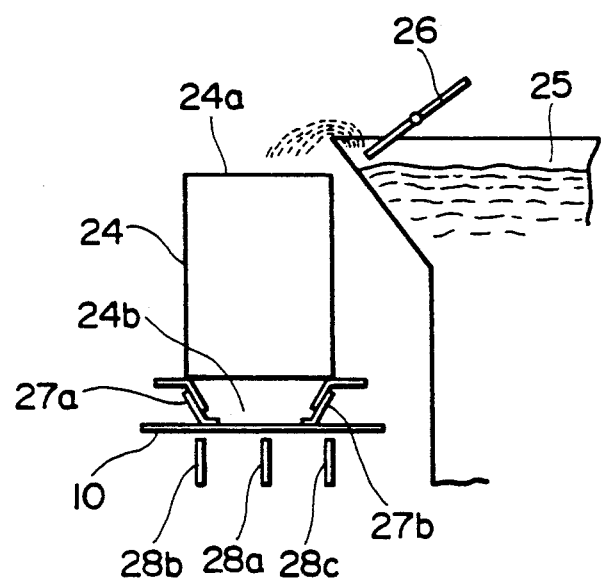
FIG. 7 is a schematic sectional view of the scum chute and the surroundings.
Figure 8:
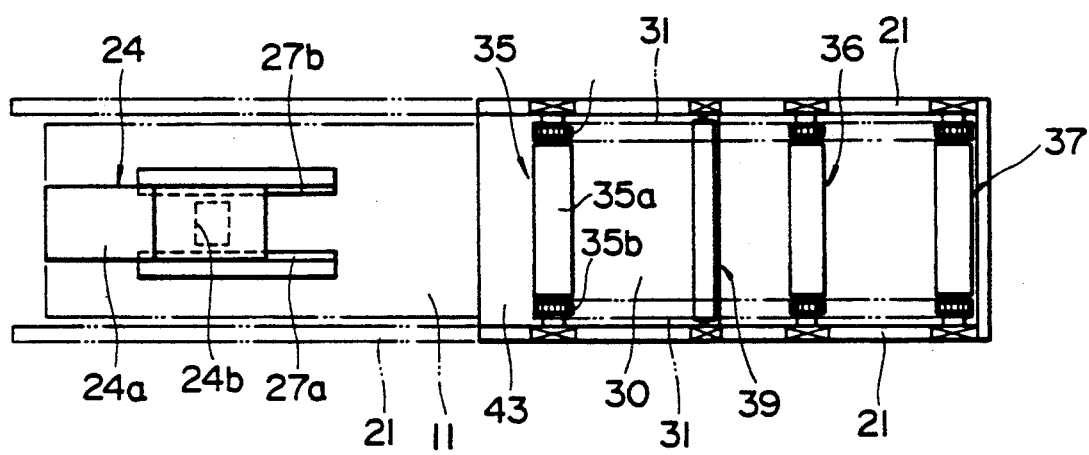
FIG. 8 is a schematic plan view of the driving mechanism of the upper belt and the scum chute.

Referring now to FIGS. 2, 7 and 8, a scum chute 24 supplies concentrated sludge A to the lower belt 10. The concentrated sludge or scum A is scraped out of the upper part of an adjacent rotation device 25 by a skimmer 26 and is received by the receiving port 24a of the scum chute 24. From there, the concentrated sludge or scum A is discharged from the outlet port 24b of the scum chute. The outlet port 24b includes antileaking skirts 27a and 27b of separated V form on both sides of the outlet port 24b to prevent dropping of the concentrated sludge A over the edge of the lower belt 10. Thin elastic substances such as rubber are attached to the top edges of the antileaking skirts 27a and 27b.

At the downward end of the scum chute 24, the sliding rails 28a, 28b and 28c (see FIGS. 5 and 7) are provided along the length direction of the lower belt 10 beneath the middle and both edges, respectively, of the lower belt 10.

Adjacent the sprocket roller 19, which is disposed just behind the press drum 38, a scraper 29 is secured to scrape away the dehydrated cakes A' which have adhered to the filter sheet 13 of the lower belt 10.

Figure 9:
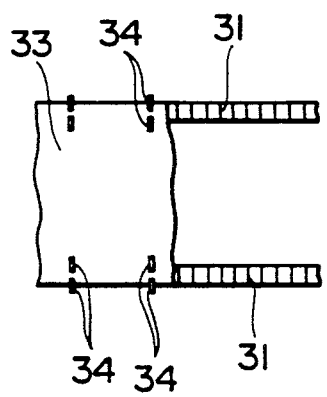
FIG. 9 is a schematic plan view of the composition of the upper belt.
Figure 10:
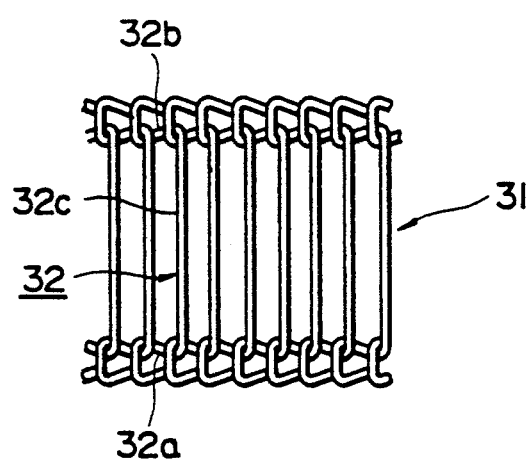
FIG. 10 is a plan view of the meshed member of the upper belt.

Referring now to FIGS. 2, 9 and 10, an upper belt 30 comprises two endless meshed members 31 and a filter sheet 33. The meshed members 31 each comprise an endless belt, combining a wire 32 having a Z-shaped bending portion 32a with an inverted Z-shape bending portion 32b, one after another, connected at their bending portions and extending in a length direction of the belt 30. The two meshed members 31 are fixed in a predetermined spacing interval by fasteners 34 connecting them one on each edge of the filter sheet 33. The filter sheet 33 is composed of a more closely woven cloth than is used in the filter sheet 13 of the lower belt 10.

The upper belt 30, having the meshed members 31 disposed interiorly and the filter sheet 33 disposed exteriorly, is placed over the teeth portion of the sprocket rollers 35, 36 and 37 and the press drum 38. Referring now to FIG. 8, the sprocket roller 35 has two sprocket wheels 35b disposed at each end of a roller portion 35a. The teeth of each sprocket wheel 35b engage a straight portion 32c of the meshed member 31 of the upper belt 30. The sprocket rollers 36 and 37 are of the same form as sprocket roller 35.

Referring again to FIGS. 2 and 5, the press drum 38 is provided with a sprocket wheel 38b at each end of the drum press member 38a. The teeth of the sprocket wheels 38b also engage the straight portion 32c of the meshed member 31. A roller 39 is adapted to abut the filter sheet 33 side of the upper belt 30 and is rotatably fixed to the frame 21. The sprocket rollers 35, 36, 37 and the press drum 38 are similarly rotatably fixed to the frame 21. Adjacent the sprocket roller 37, a scraper 40 is provided to scrape away the dehydrated cakes A' which have adhered to the filter sheet 33 of the upper belt 30.

Referring again to FIG. 2, a motor 50 drives the upper belt 30 and the lower belt 10 by means of a chain 52. The chain 52 is arranged to engage sprocket roller 19, a sprocket coaxial to the sprocket roller 37 and an idler sprocket 51. Accordingly, as the chain 52 is driven by the motor 50 in the direction of the arrow (see FIG. 2), the sprocket roller 19 is driven in a clockwise direction while the sprocket roller 37 is driven in a counter-clockwise direction. Consequently, the lower belt 10 is driven in the direction of arrow B while the upper belt 30 is driven in the direction of arrow C at the same speed. As the lower belt 10 moves, the sprocket rollers 15, 16, 17 and 20, being engaged with the meshed member 11, also move accordingly. Similarly, as the upper belt 30 moves, the sprocket rollers 35, 36 and the press drum 38, being engaged to the meshed member 31, also move accordingly.

Still referring to FIG. 2, a receiving container 41 is disposed beneath the scrapers 29 and 40 to receive the dehydrated cakes A' as they fall from the belts 10 and 30. Raw water tanks 42 and 43 are disposed beneath the lower belt 10 and the upper belt 30, respectively, to gather washing water which is sprayed onto the belts 10 and 30 by nozzles 46 and 47. A pump 45 pumps washing water from the raw water tank 42 to the nozzles 46 and 47. A pipe 44 connects raw water tank 43 to raw water 42 which is provided with an overflow discharge port 48 to return overflow water from the raw water tank 42 back to the flotation device 25.

Having described the structural features of the present invention, its use in action is easily understood as explained below. When a power source is connected, the sprocket roller 19 and the sprocket roller 37 are driven forcibly by the chain 52. Accordingly, the sprocket 19 engages the meshed member 11 of the lower belt 10 and drives the lower belt 10 in the direction of arrow B. In the same way, the sprocket roller 37 engages the meshed member 31 at both edges of the upper belt 30 and drives the upper belt 30 in the direction of arrow C at the same speed as the lower belt 10 is driven.

The concentrated sludge or scum A scraped by the skimmer 26 of the flotation device 25 is received in the scum chute 24 and, with the movement of the lower belt in the direction of arrow B, sludge is supplied from the discharge port 24b onto the filter sheet 13 of the lower belt 10. As both sides of the discharge port 24b are covered with the skirts 27a and 27b, sludge is drained onto the lower belt 10 without leaking, extending to the width edges of the lower belt 10. With movement of the lower belt 10, concentrated sludge A is supplied constantly on the lower belt 10 and proceeds to the press drum 38.

Because the filter sheet 13 is supported by the meshed member 11, the filter sheet 13 is composed of sufficiently thin and coarse material so that during pressing by the press drum 38, water in the concentrated sludge A is forced through the filter sheet 13. This water is gathered in the raw water tank 42.

As the lower belt 10 is joined with the descending upper belt 30 as they reach the sprocket 17, the concentrated sludge A placed between the filter sheets 13 and 33 of the belts is pressed strongly from the upper belt side by the press drum 38. As the sludge is dehydrated, it passes through and beyond the press drum 38. As mentioned above, the filter sheets 13 and 33 are thin enough and coarse enough that it is possible for this device to dehydrate further than the conventional devices.

During the pressing, the sprockets 17 and 18 engage both edges of the meshed member 11 of the lower belt 10. Accordingly, the center of the lower belt 10 being supported at both edges, is in an expanded condition so that sludge never leaks from the edges of the belts 10 and 30 even under strong pressure of the press drum 38. Furthermore, engagement of the sprocket rollers 15-20 with the meshed member 11, and the sprocket rollers 35-39 with the meshed member 31, eliminate slipping or meandering of the belt during operation.

Pressed by the press drum 38 as outlined above, the concentrated sludge A is transformed into the dehydrated cakes A', and proceeds to the sprocket roller 19 and the sprocket roller 37 attached to the filter sheets 13 and/or 33 where the cakes A' are scraped down by the scrapers 29 and 40 and drop into the dehydrated cake receiving container 41.

The washing water gathered in the raw water tank 42 is pumped by the pump 45 to the nozzles 46 and 47 and is sprayed onto the lower belt 10 and the upper belt 30 respectively to wash them. Since the filter sheets 13 and 33 are so thin and coarse, it is easy to wash out the remaining cakes. Water washing the upper belt 30 is gathered in the water tank 43 and discharged through the pipe 44 to the water tank 42. The water washing the lower belt 10 is gathered directly into the water tank 42. Thus, the water from the tank 42 is repeatedly circulated to wash the belts 10 and 30. When the height of the water in tank 42 reaches the overflow discharge port 48, the overflow flows into the raw water tank (not shown) of the flotation device 25.

An example of the dehydration efficiency of the preferred embodiment of this invention is given by Table 1 below:

TABLE 1

| SORT OF CONCENTRATED SLUDGES | MOISTURE CONTENT RATE (%) | |
|---|---|---|
| | in feed | in dehydrated cakes |
| INDUSTRIAL PROCESSED FLOATING SCUMS | 90–95 | 65–70 |
| PHOTO ETCHING DRAINAGE PROCESSED FLOATING SCUMS | 90–95 | 70–75 |

Compared with conventional devices, which produce a moisture content in the dehydrated cakes of about 80–90%, the present device produced dehydrated cakes having a moisture content of 65–75%.

Figure 11:
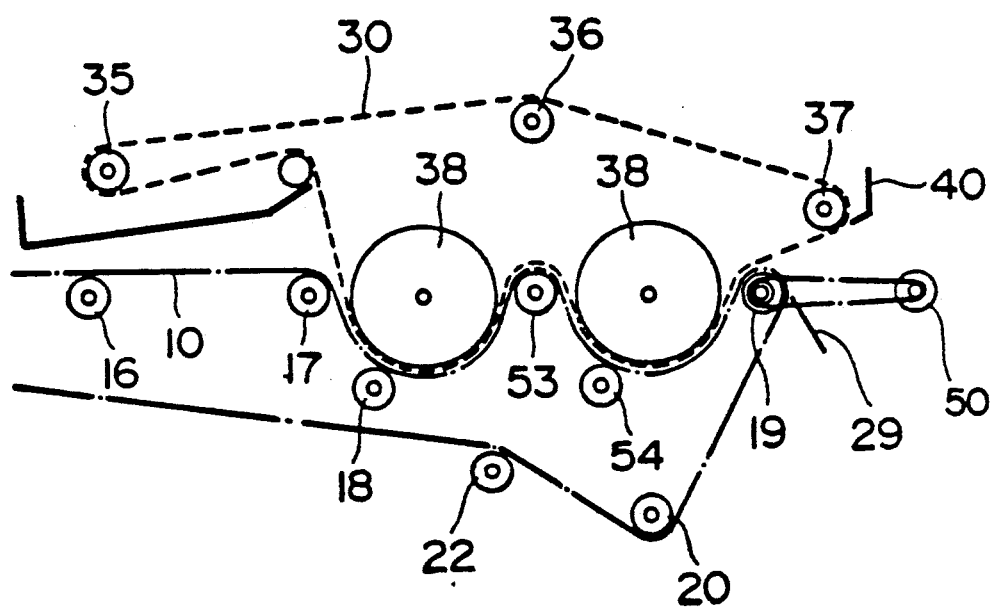
FIG. 11 is a schematic mechanical view illustrating another embodiment of the present invention.

A second embodiment of the present invention is shown in FIG. 11 and comprises double pressing drums step 38 which increase the dehydration efficiency. In this embodiment, the sprocket rollers 53 and 54 are of the same form as the sprocket roller 19.

In another variation, the sprocket wheels 38b at each end of the press drum 38 are replaced by a rubber covered portion so that the press drum 38 is rotated in conjunction with the upper belt 30 by the friction between the meshed members 31 and the rubber covered portion.

Certain advantages of the belt press type dehydration device according to the present invention include:

1) Because the belt of the present invention is driven by the engagement of the meshed member and the sprocket teeth, the tension required of conventional device belt is unnecessary. Therefore, the filter sheet need not have high tensile strength and may be made as thin and coarse as possible, thereby increasing dehydration efficiency.

2) Because the present device requires only one or, at most, two steps of the pressing drum, where up to ten or more were required in the conventional devices, and because the necessity of a vaccuum device is eliminated, the present invention can be much smaller and less costly than previously known devices.

3) Because the filter sheet is composed of a thin and coarse material which is easily washed, the high pressure of the wash systems of the conventional devices and great amounts of washing water are unnecessary in the present invention.

4) Because the belts are driven by the engagement of the meshed member with the sprocket teeth, the belt is prevented from slipping or meandering as it did on the rollers of the previously known devices. Accordingly, antimeandering attachments which increase the bulk and cost of conventional devices are unnecessary.

5) Because it is thin and coarse, the filter sheet of the belt is relatively low cost and easily exchanged.

6) Because the filter sheet is thin and coarse and highly efficient, the belt can be driven at a higher speed than in the conventional devices and, consequently, the quantity of output work is increased.

Having described my invention, however, many modifications thereto will become apparent to those skilled in the art to which it pertains without deviation from the spirit of the invention as defined by the scope of the appended claims.

I claim:

1. A belt press type dehydration device comprising:
   a plurality of rotatably supported first sprocket rollers having parallel axes;

a plurality of ratatably supported second sprocket rollers having axes parallel to said axes of said first sprocket rollers;

an endless first belt disposed about said first sprocket rollers and drivable in a first closed loop, said first belt comprising an outer first filter sheet layer having two edges and an inner first mesh support layer attached to said edges of said first filter sheet layer;

an endless second belt disposed about said second sprocket rollers and drivable in a second closed loop, said second belt comprising an outer second filter sheet layer having two edges and an inner second mesh support layer attached to said edges of said second filter sheet layer;

means for pressing said first belt and said second belt together;

means for depositing hydrated material on at least one of said filter sheet layers;

means for driving said first and second belts along said first and second closed loops, respectively, from said means for depositing towards said means for pressing, wherein said first and second sprocket rollers are disposed so that a portion of said first belt lies closely adjacent a portion of said second belt and said means for pressing presses these portions together to dehydrate said hydrated material;

wherein said first and second mesh layers each comprise closed loops of interlocked wire;

and wherein said first mesh layer comprises a single closed loop of interlocked wire extending from one edge of said first filter sheet to the other and said second mesh layer comprises two closed loops of interlocked wire, each extending inwardly from said attached edges of said second filter sheet.

2. The device as defined in claim 1 wherein said closed loops extend inwardly a distance less than one half the distance from one edge to the other of said second filter sheet.

3. The device as defined in claim 1 wherein said closed loops extend inwardly a distance about one eighth the distance from one edge to the other of said second filter sheet.

4. The device as defined in claim 1 wherein said means for driving includes toothed sprocket wheels secured to said sprocket rollers for rotation therewith, and wherein said sprocket wheels are axially positioned to engage portions of said interlocked wire of said mesh layers to drive said belts.

* * * * *